US006776672B2

(12) United States Patent  
Roycroft

(10) Patent No.: US 6,776,672 B2
(45) Date of Patent: Aug. 17, 2004

(54) POWER TRAIN

(75) Inventor: Terence James Roycroft, Waiuku (NZ)

(73) Assignee: Gibbs Technologies Limited (GB)

( * ) Notice: Subject to any disclaimer, the term of this patent is extended or adjusted under 35 U.S.C. 154(b) by 0 days.

(21) Appl. No.: 10/363,763

(22) PCT Filed: Sep. 4, 2001

(86) PCT No.: PCT/GB01/03955

§ 371 (c)(1),
(2), (4) Date: Mar. 5, 2003

(87) PCT Pub. No.: WO02/22383

PCT Pub. Date: Mar. 21, 2002

(65) Prior Publication Data

US 2003/0176118 A1 Sep. 18, 2003

(30) Foreign Application Priority Data

Sep. 13, 2000 (GB) .............................................. 0022397

(51) Int. Cl.[7] .............................................. B63H 19/08
(52) U.S. Cl. .................................................... 440/12.5
(58) Field of Search ............................ 440/12.51, 12.5, 440/12.57, 12.58, 12.59, 12.6, 12.61

(56) References Cited

U.S. PATENT DOCUMENTS 3,131,666 A    5/1964 Sessions
4,464,945 A    8/1984 Ertl .............................. 74/15.6
5,570,653 A  * 11/1996 Gere et al. ................ 440/12.51
5,752,862 A    5/1998 Mohler et al. ................. 440/38

FOREIGN PATENT DOCUMENTS

GB         2134857 A  *  8/1984  ............. B60F/3/00

OTHER PUBLICATIONS

Copy of International Search Report, dated Jul. 12, 2001.
Copy of United Kingdom Search Report dated Nov. 24, 2000.

* cited by examiner

Primary Examiner—Jesus D. Sotelo
(74) Attorney, Agent, or Firm—Young & Basile, P.C.

(57) ABSTRACT

Amphibious vehicle power train includes an engine mounted above, or above and to one side of transmission. Axis of crankshaft is parallel to axis of transmission input shaft, and to longitudinal vehicle axis. Crankshaft longitudinally overlaps input shaft. Engine is mounted North-South, and transmission South-North. Crankshaft drives input shaft through sprockets, connected by belt or chain; or by gears. Shaft drives marine propulsion means through drive shaft and optional decoupler. Transmission may be manual, sequential change manual, automated manual, seem-automatic, automatic, or continuously variable. Power train may be mounted towards the rear of the vehicle, driving the rear wheels through differential. Alternatively, the front wheels may also be driven, through drive shaft and differential. Either axle may be decoupled in road mode.

18 Claims, 3 Drawing Sheets

POWER TRAIN

The present invention relates to a power train, and more particularly to a power train for driving the road wheels and the marine propulsion means of an amphibious vehicle. The invention also relates to an amphibious vehicle having such a power train.

In an amphibious vehicle it is advantageous to use a power train in which an engine and transmission are positioned towards the rear of the vehicle. The weight of the power train is therefore positioned towards the back of the vehicle, which is necessary for good vehicle performance when the vehicle is in marine mode. Furthermore, the position of the power train maximises the space available towards the front of the vehicle for the passenger compartment.

A power train Is disclosed for use in an amphibious military personnel carrier in U.S. Pat. No. 5,752,862 (Mohler). The disclosed power train uses a rear mounted engine and a combined transmission and differential mounted at the front of the vehicle. Although Mohler uses the drive shafts from the differential to drive caterpillar tracks, such drive shafts could also be used to provide drive to the front road wheels of a civilian amphibious vehicle. However, the power train arrangement disclosed in Mohler has several disadvantages for application to such a civilian vehicle. First, the location of the transmission at the front of the vehicle may reduce passenger and/or luggage space. Secondly, the arrangement requires a propeller shaft running through the passenger area. This shaft, which carries full engine power and rotates at engine speed, takes up valuable passenger space and will generate noise. Third, front, wheel drive is not an optimal solution for a rear engined vehicle, as traction will not be as good as if the engine weight is placed over the driven wheels. This can give problems for example intake-off on slippery surfaces, and unusual on-road handling characteristics. There are some circumstances where driving front wheels only may be advantageous, e.g. when exiting water; but it is preferred that this is not the only option available to the driver.

Other power train arrangements for use in an amphibious vehicle are known from U.S. Pat. No. 5,590,617 (Aquastrada) and U.S. Pat. No. 3,765,368 (Asbeck). In these power trains an engine and transmission are connected end-to-end in conventional automotive rear wheel drive fashion, but with the overall arrangement reversed to drive the front wheels. As can be seen particularly clearly from Aquastrada, this forces the passenger seating area towards the front of the vehicle, followed by a long rear deck area which cannot be used for passenger or luggage space.

It is an object of the invention to resolve problems in packaging and traction in the prior art solutions, reducing the lengthwise space taken up by the power train.

According to a first aspect of the present invention, there is provided a power train for an amphibious vehicle comprising an engine and a transmission, the engine and the transmission being positioned with the axis of the crankshaft of the engine offset from and substantially parallel to the axis of an input drive shaft of the transmission, the arrangement being such that the power train can be positioned in the vehicle with both of said axes substantially parallel with the longitudinal axis of the vehicle; characterised in that the crankshaft of the engine longitudinally overlaps at least part of the input drive shaft of the transmission.

The invention provides a power train for an amphibious vehicle whose overall length is reduced when compared with the prior art amphibious vehicle power trains. This allows the vehicle designer to maximise the available passenger area for a vehicle of any given length. Furthermore, the inventive arrangement is particularly suited for mounting the engine and transmission towards the rear of the vehicle giving a rearward weight bias suitable for good marine performance with optimized traction at the driven rear wheels.

Preferably, the engine and transmission are positioned so that the axis of the engine crankshaft is offset above, to one side, or above and to one side of the axis of the input shaft of the transmission.

Conveniently, the input drive shaft of the transmission also drives a drive shaft of a marine propulsion means. A decoupler may be provided to selectively couple and decouple the drive from the input drive shaft of the transmission to the drive shaft of the marine propulsion means. Preferably, the marine propulsion means is a water jet unit. Alternatively, the marine propulsion unit may comprise a marine screw propeller.

Preferably the engine and transmission are adapted for mounting towards the rear of the vehicle and to provide drive to at least the rear wheels of the vehicle. The transmission may be adapted to provide drive to all the road wheels of the vehicle. The arrangement may be such that drive to the front wheels can be selectively disconnected whilst maintaining drive to the rear wheels only and vice versa.

Drive can conveniently be transmitted between the crankshaft and the input drive shaft of the transmission by means of a belt or chain. In a preferred embodiment, a first sprocket is mounted for rotation with the crankshaft and a second sprocket is mounted for rotation with the transmission input shaft, with drive being transmitted between the two sprockets by means of the belt or chain. Alternatively, gears may be used to transmit drive from the crankshaft to the transmission input shaft.

According to a second aspect of the invention, there is provided an amphibious vehicle having a power train in accordance with the first aspect of the invention.

The invention will now be described, by way of example only, with reference to the accompanying drawings in which.

Figure 1:
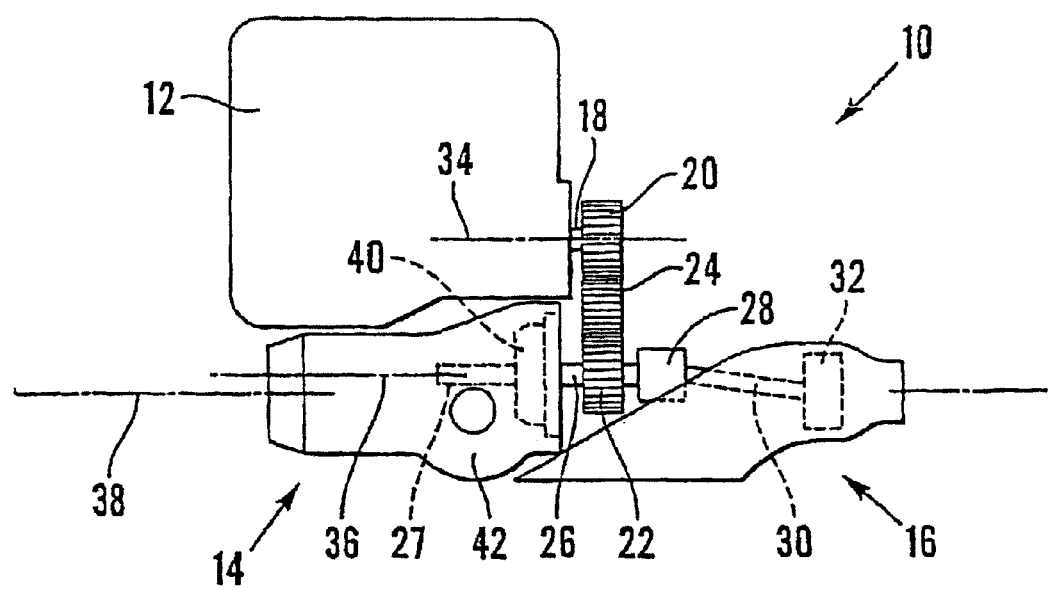
FIG. 1 shows a first embodiment of a power train in accordance with the invention, in which an engine is mounted above a transmission with an integral differential, and au input drive shaft of the transmission drives a water jet unit, the power train being suitable for a two wheel drive amphibious vehicle.

Referring firstly to FIG. 1, a power train for an amphibious vehicle is indicated generally at 10. The powers train 10 comprises an engine 12, a transmission 14 and a water jet unit 16. The engine crankshaft 18 drives a sprocket 20, which transfers drive to a driven sprocket 22 by means of a belt or chain 24. The sprocket 22 is mounted on a shaft 26, which is the input drive shaft of the transmission 14. The input drive shaft 26 also drives a decoupler 28, positioned to the right hand end (as viewed), that is towards the rear of the vehicle, of the shaft 26. The decoupler 28 selectively couples and decouples the drive from the input drive shaft 26 of the transmission to a drive shaft 30 of the water jet unit 16. An impeller 32 of the water jet unit 16 is driven by the drive shaft 30.

Whilst it is preferred that a decoupler 28 is provided to enable drive to the marine propulsion means to be decoupled when the vehicle is operating on land, this is not essential and the decoupler 28 can be omitted if desired. Where the decoupler 28 is omitted, the drive shaft 30 of the water jet may be directly coupled to the transmission input shaft 26. For example, the drive shaft 30 may be connected to the input shaft 26 via a universal or constant velocity joint.

The engine 12 is positioned above the transmission, with the axis of the crankshaft of the engine, indicated at 34, in parallel spaced relation to the axis of the input drive shaft 26, indicated at 36, and both the crankshaft and input drive shaft are parallel with the longitudinal axis of the vehicle, which is indicated at 38.

The transmission comprises a manual change gearbox and a friction clutch 40 is provided to allow drive between the input drive shaft 26 of the transmission 14 and an input shaft 27 of the gearbox itself to be selectively engaged or disengaged. The transmission also has an integral differential 42, which drives rear wheels (not shown) of the vehicle in known manner.

In alternative embodiments, the transmission could comprise an automated or sequential change manual gearbox, an automatic or a semi-automatic gearbox or a continuously variable transmission and the friction clutch could be replaced by a fluid coupling as appropriate to the type of transmission used.

Second, third and fourth embodiments of the invention will now be described with reference to FIGS. 2, 3 and 4 respectively. In each of the embodiments shown, common reference numerals have been used to designate parts in common with the parts in FIG. 1.

Figure 2:
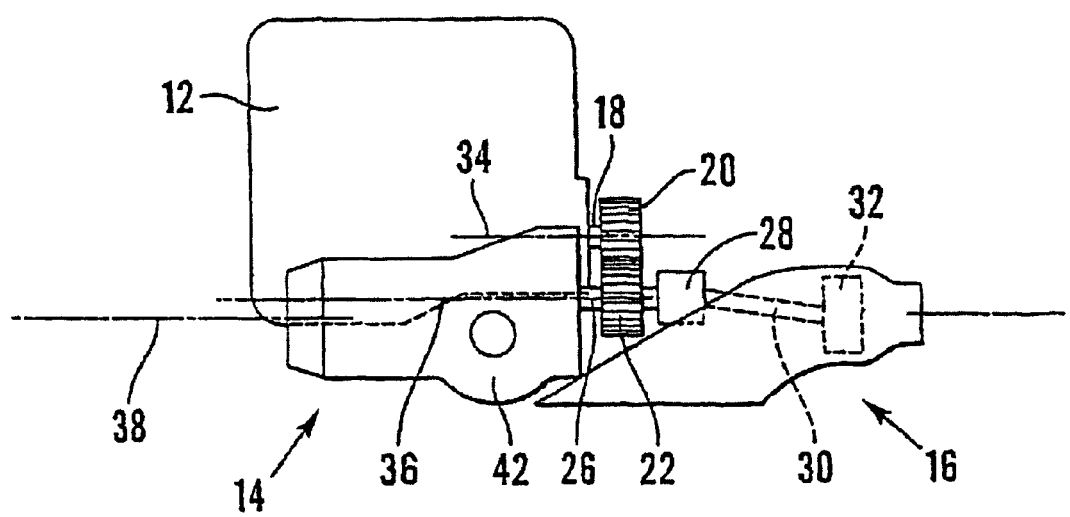
FIG. 2 shows a second embodiment of a power train in accordance with the invention, in which the engine is mounted above and to one side of the transmission, the power train being suitable for a two wheel drive amphibious vehicle.

Referring to FIG. 2, the second embodiment comprises an engine 12, transmission 14 and water jet unit 16 arranged in exactly the same manner as shown in FIG. 1, save that the engine is offset above and to one side of the transmission. The axis 34 of the crankshaft of the engine 12, is offset relative to the axis 36 of the transmission input drive shaft 26, and both are parallel with the longitudinal axis 38 of the vehicle.

Figure 3:
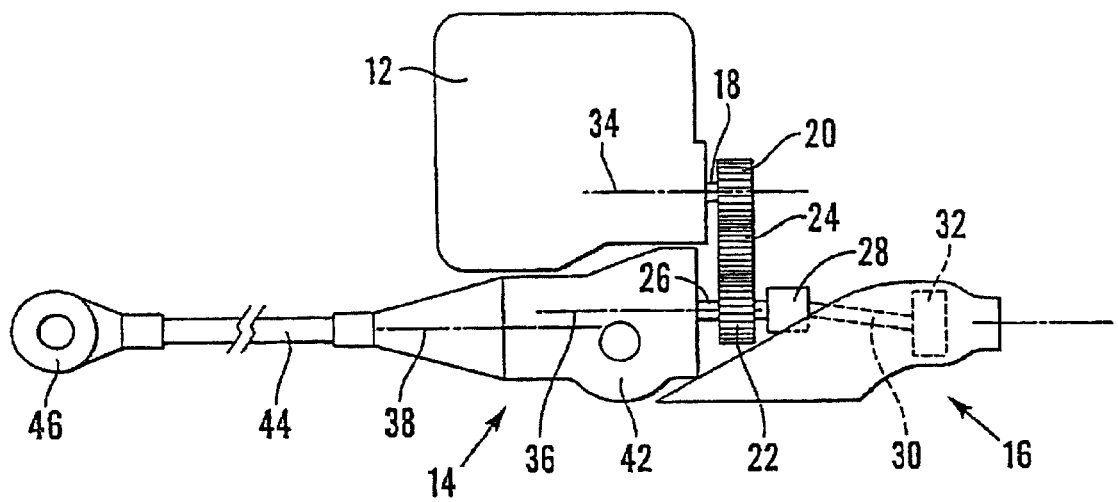
FIG. 3 shows a third embodiment of a power train in accordance with the invention, in which the engine is mounted above the transmission, the power train being suitable for a four wheel drive amphibious vehicle.

Referring to FIG. 3, the third embodiment of the invention comprises an engine 12, transmission 14 and water jet unit 16 arranged in exactly the same manner as shown in FIG. 1, however the forward end of the transmission 14 (the left hand end as viewed) also provides drive to a propeller shaft 44. A front differential 46 is driven by the propeller shaft 44, and drives front wheels (not shown) of the vehicle in known manner. The vehicle in this arrangement is therefore four wheel drive. In this embodiment, a decoupler may be provided within the transmission to selectively disconnect drive to the front axle, maintaining drive to the rear wheels only. Alternatively, an external decoupler or decouplers (not shown) could be provided in the drive line between the transmission and the front wheels. An external decoupler or decouplers (not shown) could also be provided in the drive line between the transmission and the rear wheels such drive to the rear wheels can be decoupled whilst drive to the front wheels is maintained.

Figure 4:
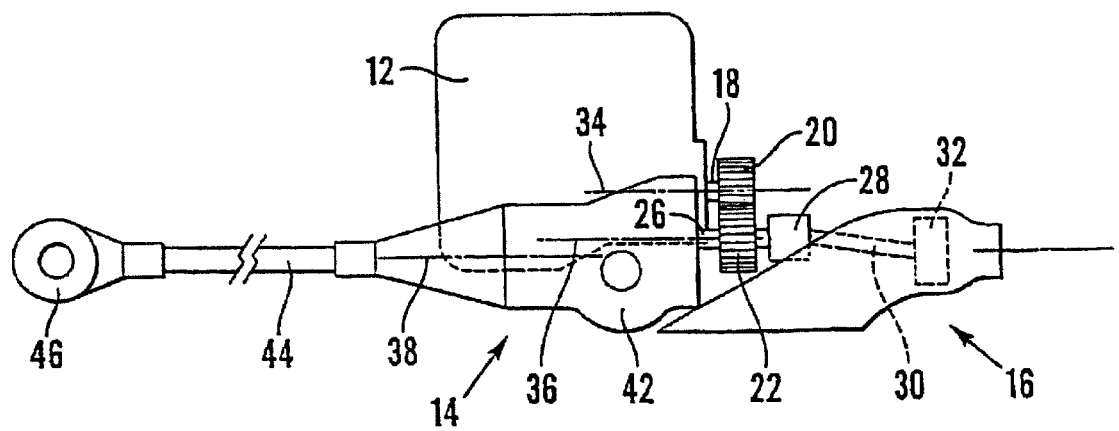
FIG. 4 shows a fourth embodiment of a power train in accordance with the invention, in which the engine is mounted above and to one side of the transmission, the power train being suitable for a four wheel drive amphibious vehicle.
Figure 5:
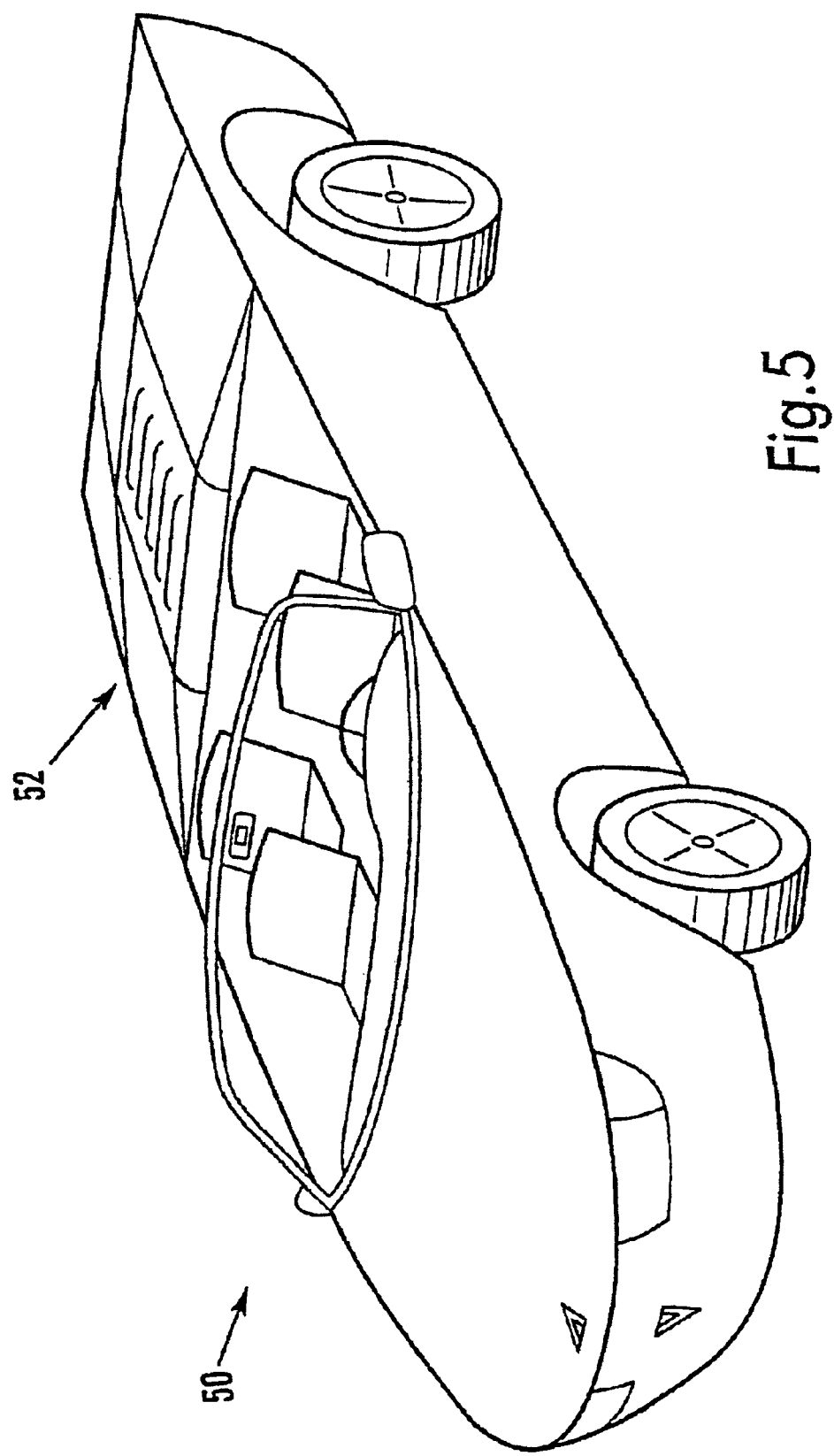
FIG. 5 shows an amphibious vehicle having a power train in accordance with the invention.

The fourth embodiment, shown in FIG. 4, is a combination of the second and third embodiments. An engine 12 is mounted offset above and to one side of a transmission 14, as in FIG. 2, and the transmission 14 provides drive to an integral rear differential 42 and to a propeller shaft 44 for driving a front differential 46. The front and rear differentials 46, 42 drive front and rear wheels (not shown) in known manner. The input drive shaft 26 of the transmission 14 drives a water jet unit 16 through an optional decoupler 28, as in the previous embodiments.

In all of the embodiments, the crankshaft 18 of the engine longitudinally overlaps the input shaft 26 of the transmission to provide an axially compact power train. The engine and transmission are positioned towards the rear of the vehicle, giving a rearward weight bias which is particularly suitable for marine operation. In use, the input drive shaft 26 of the transmission 14 is permanently driven by the engine 12, but can be conveniently disconnected from the transmission for marine mode by use of the clutch 40, enabling the transmission to be placed in a neutral position. Alternatively, an automatic transmission can be placed in neutral, allowing the torque converter to spin, acting as a flywheel, with minimal hydraulic power loss. Where fitted, the decoupler 28 can be independently operated at any time to selectively couple or decouple the drive to the water jet unit 16. Although a water jet unit 16 is shown, any other suitable marine propulsion means may be used, for example, a marine screw propeller.

What is claimed is:

1. A power train for an amphibious vehicle, the power train comprising an engine having a crankshaft and a transmission having an input shaft, the engine and the transmission being positioned with the axis of the crankshaft of the engine offset from and substantially parallel to the axis of an input drive shaft of the transmission and with the crankshaft of the engine longitudinally overlapping at least part of the input drive shaft, the power train further comprising transfer drive means for transferring drive between crankshaft and the input drive shaft, characterised in that the power train is adapted to be positioned in the vehicle with both of said axes substantially parallel with the longitudinal axis of the vehicle and with the transfer drive means located at the rearward end of the engine.

2. A power train according to claim 1, in which the engine and transmission are positioned such that the axis of the engine crankshaft is offset above the axis of the input drive shaft of the transmission.

3. A power train according to claim 2, in which the engine and transmission are positioned such that the axis of the engine crankshaft is offset to one side of the axis of the input drive shaft of the transmission.

4. A power train according to claim 1, in which the engine and transmission are positioned such that the axis of the engine crankshaft is offset to one side of the axis of the input drive shaft of the transmission.

5. A power train according to claim 1, in which the input drive shaft of the transmission is adapted to a drive a drive shaft of a marine propulsion means.

6. A power train according to claim 5, in which a decoupler is provided to selectively couple and decouple drive from the input drive shaft of the transmission to the drive shaft of the marine propulsion means.

7. A power train according to claim 5, in which the marine propulsion means is a water jet unit.

8. A power train according to claim 5, in which the marine propulsion means comprises a marine screw propeller.

9. A power train as claimed in claim 1, in which the engine and transmission are adapted for mounting towards the rear of the vehicle and the transmission is adapted to provide drive to at least a pair of rear wheels of the vehicle.

10. A power train according to claim 1, in which drive is transmitted between the crankshaft and the transmission input shaft by means of a belt.

11. A power train according to claim 10, in which a first sprocket is mounted for rotation with the crankshaft and a second sprocket is mounted for rotation with the transmission input shaft, drive being transmitted between the two sprockets by means of the belt.

12. A power train according to claim 1, in which drive is transmitted between the crankshaft and the transmission input shaft by means of a chain.

13. A power train according to claim 12, in which a first sprocket is mounted for rotation with the crankshaft and a second sprocket is mounted for rotation with the transmission input shaft, drive being transmitted between the two sprockets by means of the chain.

14. A power train according to claim 1, in which drive is transmitted between the crankshaft and the transmission input shaft by gears.

15. An amphibious vehicle comprising a power train according to claim 1.

16. A power train for an amphibious vehicle, the power train comprising an engine having a crankshaft and a transmission having an input shaft, the engine and the transmission being positioned with the axis of the crankshaft of the engine offset from and substantially parallel to the axis of an input drive shaft of the transmission and with the crankshaft of the engine longitudinally overlapping at least part of the input drive shaft, the power train further comprising transfer drive means for transferring drive between crankshaft and the input drive shaft, characterised in that the power train is adapted to be positioned in the vehicle with both of said axes substantially parallel with the longitudinal axis of the vehicle and with the transfer drive means located at the rearward end of the engine in which the engine and transmission are adapted for mounting towards the rear of the vehicle and the transmission is adapted to provide drive to at least a pair of rear wheels of the vehicle and in which the transmission is adapted to drive all the road wheels of the vehicle.

17. A power train according to claim 16, in which drive to the front wheels of the vehicle maybe selectively disconnected while drive is maintained to the rear wheels of the vehicle.

18. A power train according to claim 16, in which drive to the rear wheels of the vehicle may be selectively disconnected while drive is maintained to the front wheels of the vehicle.

* * * * *